(12) United States Patent
Shaw et al.

(10) Patent No.: US 7,114,606 B2
(45) Date of Patent: Oct. 3, 2006

(54) SELECTABLE WIDTH TRACK APPARATUS AND METHOD FOR A GRAVITY FED SHELVING SYSTEM

(75) Inventors: Kenneth A. Shaw, Wayne, IL (US); Edward I. Knorring, Jr., Wheaton, IL (US); Henry Massett, Evergreen Park, IL (US); Joseph Coretti, Jr., Wheaton, IL (US)

(73) Assignee: B-O-F Corporation, Aurora, IL (US)

( * ) Notice: Subject to any disclaimer, the term of this patent is extended or adjusted under 35 U.S.C. 154(b) by 0 days.

(21) Appl. No.: 10/141,559

(22) Filed: May 8, 2002

(65) Prior Publication Data

US 2003/0209401 A1    Nov. 13, 2003

(51) Int. Cl.
*B65G 13/11* (2006.01)

(52) U.S. Cl. .................. 193/35 R; 193/35 J; 414/276; 211/151; 198/861.1

(58) Field of Classification Search .............. 193/35 R, 193/35 J; 414/276; 211/151; 198/861.1
See application file for complete search history.

(56) References Cited

U.S. PATENT DOCUMENTS

| | | | | |
|---|---|---|---|---|
| 2,470,275 | A | * | 5/1949 | Warshaw ................... 193/35 R |
| 2,801,730 | A | * | 8/1957 | Strickler ..................... 198/780 |
| 2,969,863 | A | * | 1/1961 | Woldring et al. ......... 193/35 R |
| 2,983,352 | A | * | 5/1961 | de flora et al. ........... 193/35 R |
| 3,586,142 | A | * | 6/1971 | Inwood et al. ............ 193/35 R |
| 3,954,170 | A | * | 5/1976 | Schlough ................... 193/35 R |
| 4,718,154 | A | | 1/1988 | Bauer et al. |
| 5,048,661 | A | | 9/1991 | Toye |
| 5,178,288 | A | * | 1/1993 | Werner et al. .............. 211/151 |
| 5,474,412 | A | * | 12/1995 | Pfeiffer et al. .............. 414/276 |
| 5,788,090 | A | | 8/1998 | Kajiwara |
| 5,845,794 | A | * | 12/1998 | Highsmith ................... 211/189 |
| 5,887,732 | A | * | 3/1999 | Zimmer et al. ............. 211/59.2 |
| 5,951,228 | A | * | 9/1999 | Pfeiffer et al. .............. 414/276 |
| 6,016,900 | A | | 1/2000 | Longrod |
| 6,089,385 | A | | 7/2000 | Nozawa |
| 6,105,798 | A | * | 8/2000 | Gruber et al. ............... 211/151 |
| 6,132,158 | A | | 10/2000 | Pfeiffer et al. |
| 6,302,255 | B1 | * | 10/2001 | Hollander ................. 193/35 R |
| 6,497,326 | B1 | | 12/2002 | Osawa |
| 6,510,935 | B1 | * | 1/2003 | McIlvaine ................. 193/35 R |

(Continued)

FOREIGN PATENT DOCUMENTS

CH          302656          1/1955

(Continued)

OTHER PUBLICATIONS

"Cut Your Labor Costs in Half with the Anthony Model 4500 VOLUMEMASTER™ Gravity Flow Racks", brochure published by Anthony Manufacturing Company, n.a, n.d.

(Continued)

*Primary Examiner*—Gene O. Crawford
*Assistant Examiner*—Mark A. Deuble
(74) *Attorney, Agent, or Firm*—Marshall, Gerstein & Borun LLP (57) ABSTRACT

An apparatus and method that effects selectable width of a roller track conveyance system having multiple roller tracks with asymmetric wall heights. The system includes a clip that connects lower or mating walls of two single roller tracks together. The connected roller tracks each have their own set of rollers, which form respective dispensing surfaces. A removable divider bar, which is capable of being selectively placed into the clips between the connected roller tracks, may be placed to divide the dispensing surfaces into separate surfaces or may be selectively removed to form a larger, single dispensing surface.

30 Claims, 4 Drawing Sheets

U.S. PATENT DOCUMENTS 6,527,129 B1    3/2003    Osawa
6,629,617 B1    10/2003    Osawa
6,874,646 B1    4/2005    Jay

FOREIGN PATENT DOCUMENTS

GB    558453    *    1/1944
GB    1187712    *    4/1970
JP    2000023802    1/2000
JP    20000316680    11/2000

OTHER PUBLICATIONS

"Gravity Flow shelving Systems/Nyla-Rol™ Catalog", brochure published by B-O-F Corporation, 1994.

* cited by examiner

SELECTABLE WIDTH TRACK APPARATUS AND METHOD FOR A GRAVITY FED SHELVING SYSTEM

RELATED APPLICATIONS

This application is related to pending U.S. application Ser. No. 09/915,957, filed Jul. 25, 2001.

FIELD OF ENDEAVOR

This invention relates to gravity fed shelving for product conveyance, such as at the retail level and, more particularly, to conjoined roller tracks for the gravity fed shelving having a selectable track width.

BACKGROUND

Roller-type gravity fed shelving is typified by the roller-type commodity stand of U.S. Pat. No. 6,089,385, and the conveyor of U.S. Pat. No. 5,048,661. Additionally, there are also the "Volume Master" (Trademark) gravity flow tracks made by Anthony Manufacturing Company, Inc., of San Fernando, Calif. Finally, the assignee of the present application also has long made its Nyla-Rol® gravity flow shelving. Particularly, rollers transversely mounted at spaced locations along one or more track members, and with their uppermost height stationed at a point above the tracks, are used to roll-convey product along the track. In a gravity-fed alignment situation, the rear of the track is higher than the front or dispensing end, and product is fed by gravity and rolls to the frontmost available position along the track.

Because of the various products needing conveyance, e.g., half gallon milk containers on the one hand versus smaller soft drink cans and cartons of half and half cream on the other hand, product widths vary greatly. When used in retail sales settings, e.g., convenience stores, it is important that such gravity fed roller tracks not only operate smoothly, continuously feed the product to the front without a product "hangup" on any portion along the track, and can be easily installed and cleaned but that the tracks easily accommodate the various product widths. When the product widths vary greatly, different track widths, i.e., different structural track members, are needed in the prior art to accommodate large width differences.

SUMMARY

According to an aspect, a gravity flow roller track system for transporting product containers is disclosed including a roller track having a roller tray having a bottom and first and second side supports. The first side support is comprised of a first support wall, a first extension wall, and a guide wall, with the first support wall extending substantially normal to the bottom, the first extension wall extending downwardly and outwardly from a top edge of the first support wall, and the guide wall extending substantially normal from an outside edge of the extension wall. The second side support is comprised of a second support wall and a second extension wall, with the second support wall extending substantially normal to the bottom and having a plurality of apertures therein that are configured to receive a joining clip. The second extension wall extends downwardly and outwardly from a top edge of the second support wall. Each of the first and second support walls also include a plurality of spaced recesses. A plurality of rollers having first and second ends is further included, with the first and second ends being mounted in the plurality of recesses.

According to another aspect, a selectable width gravity feed roller system is disclosed with a first roller tray having a plurality of rollers and first and second sides being fixedly separated, wherein the first and second sides support the rollers. The first side has a first height and the second side has a second height that is less than the first height. Also, a second roller tray is included having a plurality of rollers and first and second sides being fixedly separated, with the first and second sides supporting the rollers. The first side has a first height and the second side has a second height that is less than the first height. Finally, a joining clip is included that is operable to connect the first roller tray to the second roller tray.

According to yet another aspect, a clip is disclosed for joining a plurality of roller trays in a gravity feed roller system, wherein each of the roller trays comprises a side defining a plurality of apertures. The clip includes first and second sides respectively having at least one protruding tine configured to engage with respective ones of the plurality of apertures to connect two or more of the plurality of roller trays.

According to yet a further aspect, the clip is further disclosed to include generally vertically-oriented slots to receivably retain a removable divider bar member to selectively separate the respective roller dispensing surfaces of the plurality of roller trays.

According to yet another aspect, a gravity feed roller system for dispensing products is disclosed that includes a plurality of rollers, a plurality of roller trays each having first and second vertical sides supporting the rollers to form a first roller dispensing surface. The first vertical side has a first height and the second side has a second height that is less than the first height. Also included is a means for connecting at least two of the roller trays along the second sides to form a second roller dispensing surface, the second roller surface including at least two of the first roller dispensing surfaces.

According to still another aspect, a method providing selectable dispensing surface widths for use in a roller track system for transporting product containers is disclosed. The method includes providing first and second roller trays, each having a plurality of rollers defining respective first and second dispensing surfaces. The first and second roller trays are connected together at respective joining surfaces of the first and second trays with means for connecting the trays, wherein the joining surfaces of the first and second trays do not extend in an upward direction above the first and second dispensing surfaces defined by the plurality of rollers and a third dispensing surface is correspondingly defined from a combination of at least a portion of the first and second dispensing surfaces. A removable divider member may be selectively disposed between the first and second roller trays, where the member is operable to selectively divide the third dispensing surface.

DETAILED DESCRIPTION OF THE PREFERRED EMBODIMENTS

Figures 1, 2:
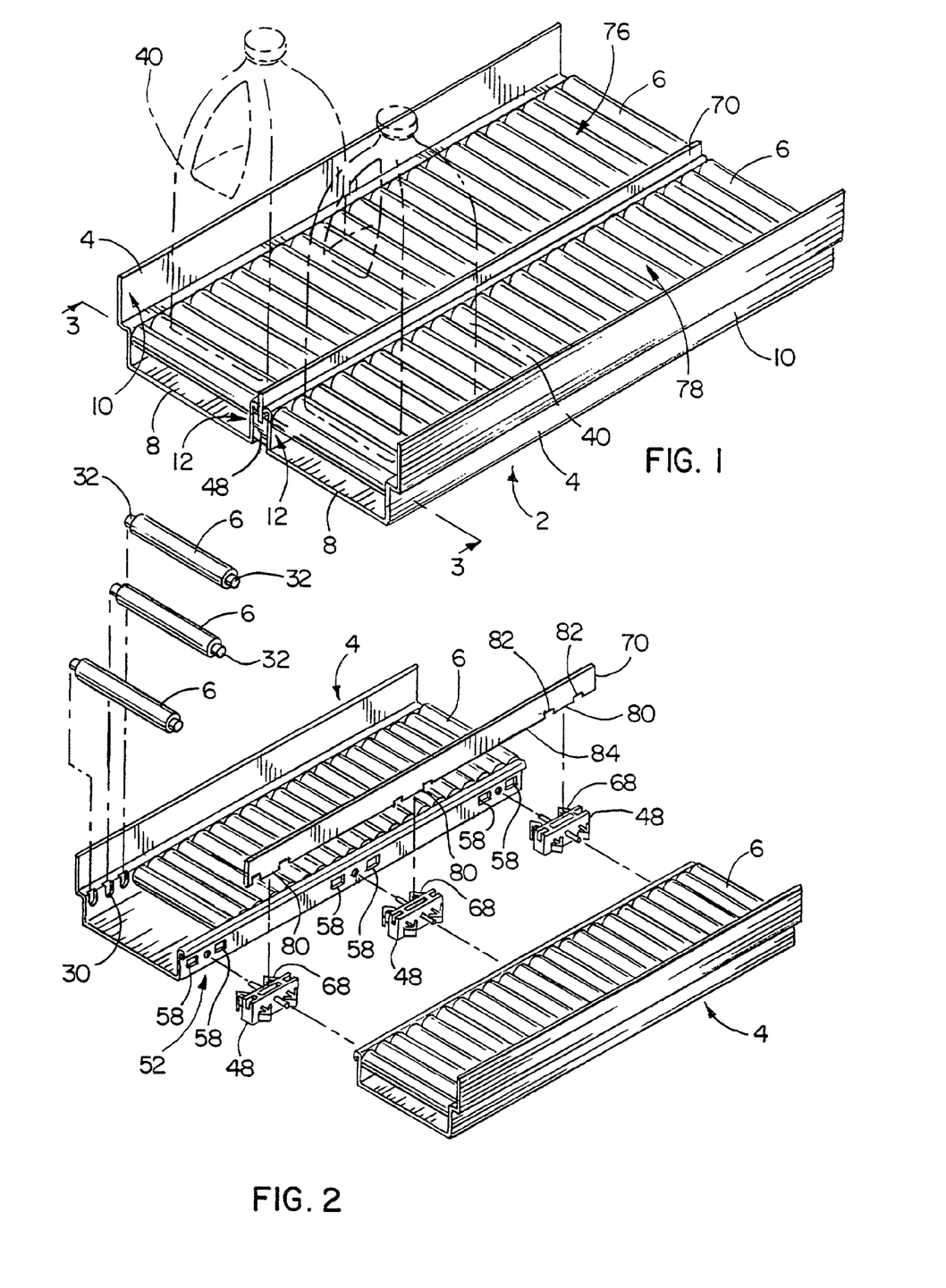
FIG. 1 is a perspective view of a selectable width gravity flow roller track system constructed in accordance with the teachings of the present invention.
FIG. 2 is a perspective view of the partially disassembled system shown in FIG. 1.
Figure 10:
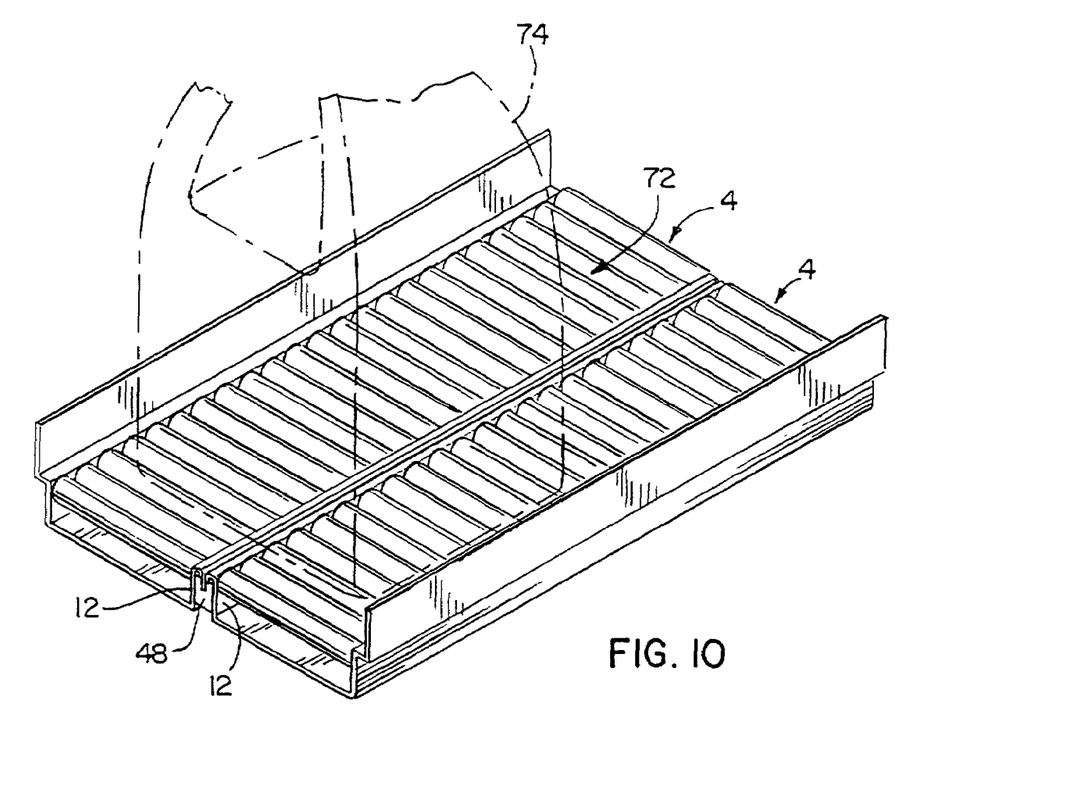
FIG. 10 is a perspective view of the selectable width gravity flow roller track system of FIG. 1 with a divider bar selectively removed to accommodate a larger product.

The presently disclosed system is a selectable width gravity feed roller track system, as shown generally by reference 2 in FIG. 1. While the track system 2 is generally used as a gravity feed system, meaning that the track is angled so as to allow gravity to pull conveyed products forward to a dispensing position, it is to be understood that the presently disclosed system may be employed for other types of roller conveyors including horizontal conveyors. Furthermore, while the gravity feed roller track system 2 will be described below primarily for use with product movement within refrigerated display cases used in convenience stores, refrigerators of boxed bulk food shelving at warehouse food stores and refrigerator dairy-to-retailer roller shipper/display shelves, it is to be understood that the disclosed system may be employed in other situations requiring product conveyance. Moreover, by selectable width, it is meant that the roller track system may convey products of a particular size, preferably in parallel as illustrated in FIG. 1, and also may convey larger products by the same system through modification, such as by removal of a divider bar, in order to convey these larger products as illustrated in FIG. 10, for example.

As shown in FIG. 1, the selectable width roller track system 2 includes a plurality of roller frames or trays 4 within which are mounted a plurality of rollers 6. Each roller tray 4 has a bottom or base 8 that is substantially planar in shape. The roller tray 4 also includes first and second side edges or supports 10, 12 that extend vertically upward or substantially normal to the base 8. The bottom 8 serves to support and fixedly separate the first and second supports 10, 12 substantially parallel to one another, but it will be appreciated by those skilled in the art that other means and arrangements such as supports at the ends of the first and second supports 10, 12 could be used to support and fixedly separate the supports 10, 12 parallel to one another.

Figure 3:
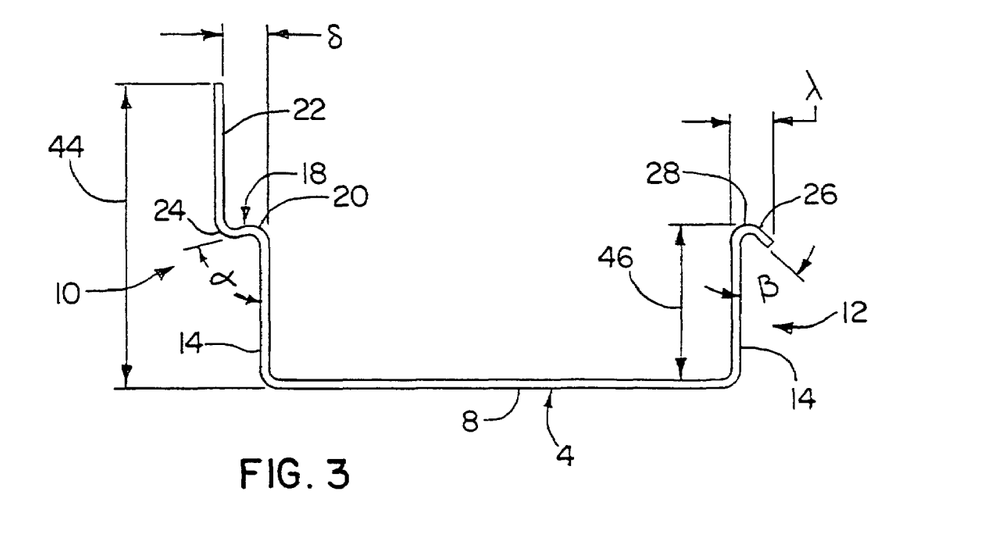
FIG. 3 is a cross-sectional end view of a roller track frame as used in the system of FIG. 1.

As further shown in FIG. 3, the first and second side supports 10, 12 each include an extension wall 14 having an essentially identical height 16. The first side support 10 also includes an extension wall 18, which extends downward and outwardly from a top edge 20 of the first support wall 14. As illustrated in FIG. 3, the first extension wall 18 extends away from the extension wall 14 of the first support 10 at an acute angle a. Preferably, the angle $\alpha$ is approximately 75 degrees, but may range from approximately 45 degrees to 85 degrees. The importance of this range of angles will be discussed further in detail.

As further shown in FIG. 3, the first support wall 10 also comprises a guide wall 22 that extends vertically from an outside edge 24 of the extension wall 18. As shown in FIG. 3, the guide wall 22 extends substantially normal to the base 8 of the roller tray 4. The guide wall 22 and the extension wall 14 are substantially parallel and offset by a distance 6, which is equal to the width of the extension wall 18. Furthermore, as may be seen in FIG. 3, the first support 10 is substantially "z-shaped" in its vertical cross section. The importance of this shape will be discussed in further detail to follow.

The second support wall 12 also includes an extension wall 14, as discussed previously. A second extension wall 26 extends downward and outward from a top edge 28 of the extension wall 14 of the second support wall 12. As shown in FIG. 3, the second extension wall 26 extends downward at an acute angle $\beta$ from the plane of extension wall 14. Preferably, this angle $\beta$ is approximately 45 degrees but may be less than or greater than this particular angle up to approximately 85 degrees. This angle, however, is selected, by taking account of the length of second extension wall 26, to allow a spacing or gap between two roller trays 4 that are connected to one another, as will be described later.

Figure 4:
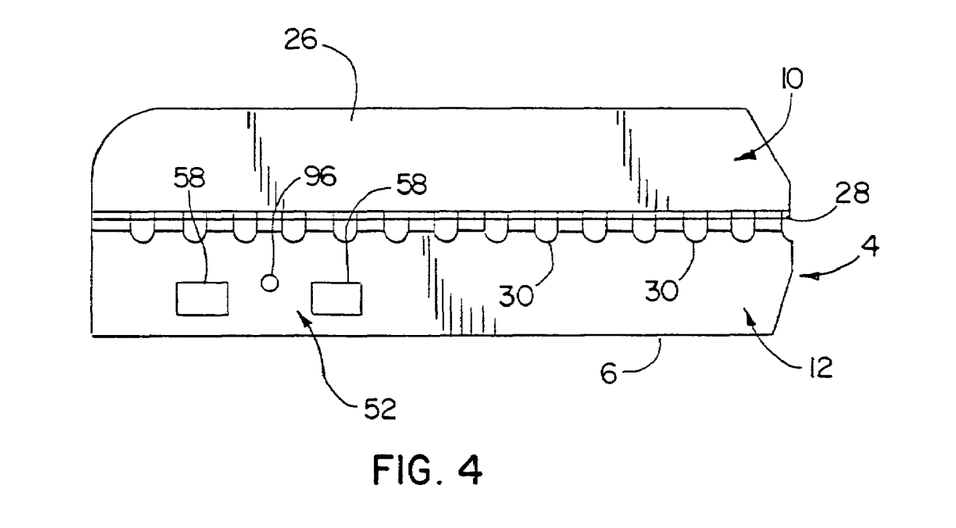
FIG. 4 is a side view of the roller track illustrated in FIG. 3.

Turning to FIGS. 2 and 4, each roller tray 4 further includes a plurality of spaced recesses 30 for journaling of the rollers 6 within the tray 4. Each of the recesses 30 is formed in the extension walls 18 and 26 and the support walls 14 of the first and second supports 10, 12. The recesses 30 are formed so as to substantially frictionally engage and retain hubs 32 of the rollers 6 located at each end of the rollers 6, while allowing the rollers 6 to rotate freely. In order to accomplish this retention, top portions of the spaced recesses 30 are configured slightly smaller in diameter than the roller hubs 32.

Figure 5:
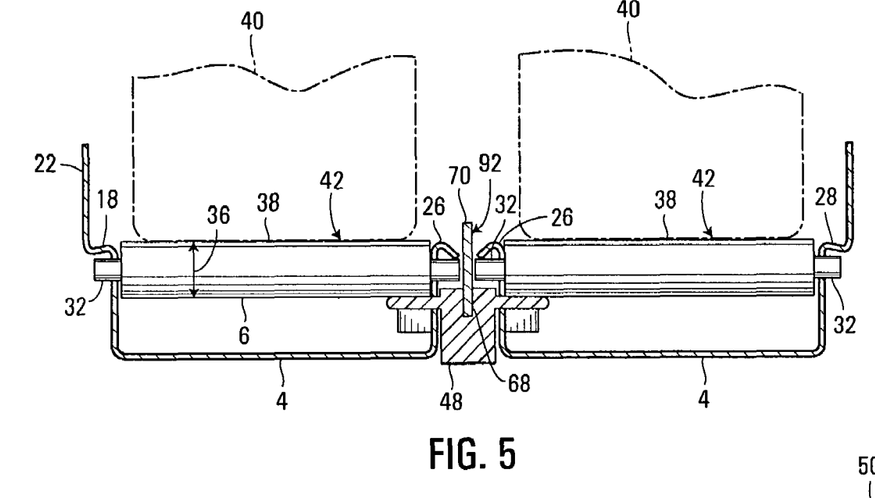
FIG. 5 is a cross-sectional end view of the roller track system of FIG. 1.

Referring to FIG. 5, it is noted that the placement of the recesses 30 within the first and second supports 10, 12 as well as the diameter 36 of the rollers 6 are selected such that a top edge 38 of the rollers 6 extends above the first and second extension walls 18, 26. A benefit of such positioning is that a product 40, as shown in phantom lines in FIGS. 1 and 5, may roll on the rollers with adequate clearance between a bottom surface 42 of the product 40 and the extension walls 18 and 26. In concert with such clearance, the guide wall 22 ensures lateral positioning of the product 40. Accordingly, the product 40 may remain correctly positioned on the roller track 4 as well as freely moving along the roller track 4 when positioned at a sufficient incline to ensure gravity feed of the product 40.

Turning again to FIG. 3, it is further noted that the heights of the supports for each roller tray 4 are preferably asymmetric wherein a height 44 of the first support 10 is greater than a second height 46 of the second support 12. Further, as may be seen in FIG. 5, the top edge of the rollers 6 is extended above the second height 46, which is the height of the second support 12, but preferably is below the height 44 of the first support 10 in order to allow the guide wall 22 to promote lateral positioning of the product 40, as discussed previously.

Figure 6:
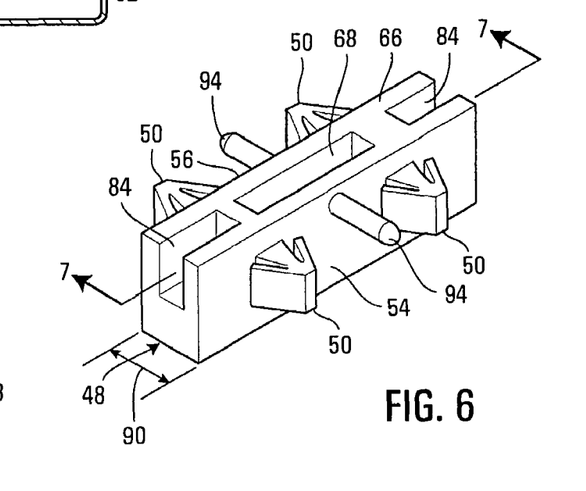
FIG. 6 is a perspective view of a joining clip used in the roller track system of FIG. 1.

A feature of the selectable width roller track system 2 illustrated in FIG. 1 is the connection of at least two roller trays 4, which may be selectably divided into two separate dispensing surfaces or converted into a single dispensing surface. In order to accomplish this selectability, the system 2 features a plurality of joining clips 48 that are configured to join to roller trays 4 as illustrated in FIGS. 1, 2 and 5. The clips 48 are provided with a plurality of protruding tines 50 that are configured to cooperate with groupings of apertures 52 defined within the extension wall 14 of the second supports 12 of each roller tray 4. Specifically, the tines 50, as shown in FIG. 6, are configured to insert into corresponding apertures in the aperture groupings 52 and affix the joining clip 48 to two roller trays 4 on first and second sides 54, 56 of the joining clip 48, thereby conjoining or connecting two roller trays 4. Preferably, each aperture grouping 52 includes a pair of apertures 58 as shown in FIGS. 2 and 4 that correspond to a pair of tines 50 on each of the respective sides 54, 56 of the joining clips 48.

Figure 7:
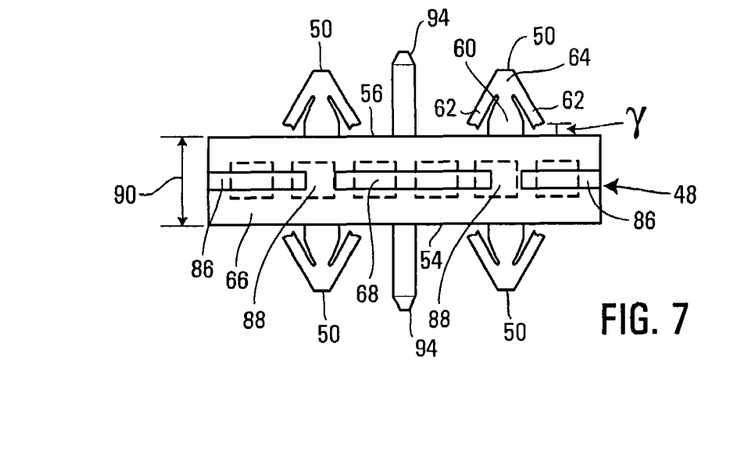
FIG. 7 is a top view of the joining clip of FIG. 4.

The tines 50 of the joining clips 48 are configured preferably with an arrow shape as illustrated in FIG. 7 and comprise a center post 60 that is connected to one of the sides 54, 56 of the joining clip 48. A pair of flexible arms 62 are attached to an end portion 64 of the center post 60 and extend away therefrom at an angle thereby forming the arrow shape profile as seen in FIG. 7. The flexible arms 62 are configured such that they have a normal biased position. When the tines 50 are inserted into the locking apertures 58, however, the flexible arms 62 are configured to allow movement of the arms 62 toward the center post 60. The length of the flexible arms 62 is selected such that a gap y exists between ends of the flexible arms and the sides 54, 56 of the clip 48. Thus, when the tine 50 is fully inserted into the locking aperture 58, the flexible arms 62 are able to return to their normal biased position thereby locking the tines 50 into the apertures 58. It will be appreciated by those having skill in the art that the particular arrow shape of the tines 50, which enable locking of the clip 48 to the roller tray 4, may be formed in numerous different configurations that provide locking of protruding tines or nipples to a corresponding aperture. Additionally, the clips 48 are preferably made of an injection-molded plastic material, but may be constructed from any other suitable material.

Figure 8:
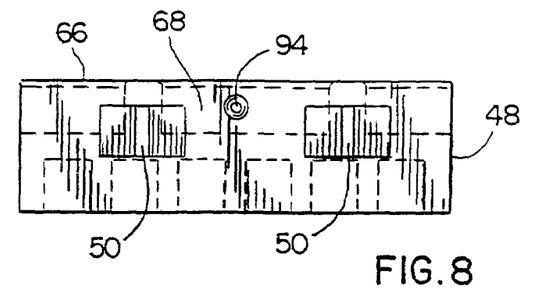
FIG. 8 is a side view of the joining clip of FIG. 4.
Figure 9:
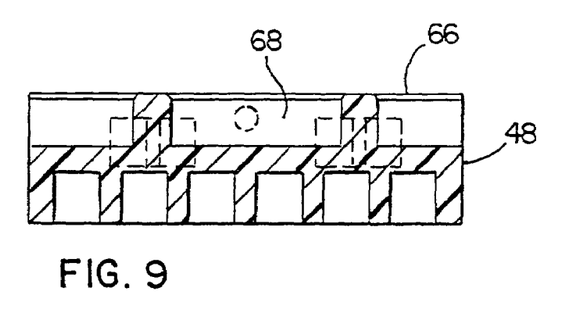
FIG. 9 is a cross-sectional side view of the joining clip of FIG. 4.

Each of the joining clips 48 further comprise a top portion 66 as shown in FIGS. 6–8 that includes at least one slot 68 defined therein, which is generally vertically oriented. The purpose for the slot 68 is to engage and receivably retain a removable, elongated divider bar member 70 that may be selectively placed in the roller track system to divide a singular large dispensing surface 72, as is illustrated in FIG. 10 and that can convey a large product 74, e.g., a gallon container of milk, into a first dispensing surface 76 and second dispensing surface 78 as shown in FIG. 1 that each can respectively convey a smaller product 40, e.g., a half gallon or a quart of milk. It is noted that the FIG. 1 illustrates that the first and second dispensing surfaces 76, 78 are substantially the same width. However, the widths of the first and second dispensing surfaces are not limited to the same width, but could also have differing widths. Additionally, it will be appreciated by those skilled in the art that the singular large dispensing surface 72 may consist of at least a combination of the first and second dispensing surfaces 76, 78, as shown, or a combination of portions thereof. Moreover, it will be appreciated that the introduction of the divider bar 70 to divide the width of large dispensing surface 72, will yield widths of the first and second dispensing surfaces whose sum width will be slightly less than the width of surface 72 due to the width of the divider bar 70.

In order to engage the elongated divider bar 70 with the slots 68, the divider bar 70 includes a plurality of tabs 80 that are configured to matingly insert into the slots 68 as illustrated in FIG. 2. Furthermore, these tabs 80 may be defined by a pair of cutout slots 82 formed in a bottom edge 84 of the divider bar 70, thereby defining tab 80 as further illustrated in FIG. 2. In order to ensure proper seating of the divider bar 70 into the slot 68 defined in the top surface 66 of the joining clips 48, a pair of partial slots 86 may further be formed in the top surface 66 of the joining clips 48. Accordingly, a portion 88, shown in FIG. 7, in the top surface 66 defined between the slot 68 and the respective partial slot 86 may positively engage with the cutout slots 82 defined in the bottom edge of the divider bar 70 to positively hold the bar 70 in place and prevent movement thereof.

Each of the plurality of joining clips 48 is further configured to have a predetermined thickness 90 that will ensure that the divider bar 70 has access to at least the slots 68 defined in the top portion 66 of the clips 48. The predetermined thickness 90 is selected taking into account the horizontal distance $\lambda$ of the second extension walls 12 of each roller tray 4 as illustrated in FIG. 3. As mentioned previously, the angle $\beta$ is selected to further ensure that the divider bar 70 has access to the slot 68 in the top portion 66 of the joining clips 48. As is evident, the lesser the angle a, the lesser the distance $\lambda$ becomes. When two of the roller trays 4 are connected together with the joining clips 48, a gap 92 as shown in FIG. 5 is defined between the extension walls 26 of the two connected roller trays 4 that permits insertion of the divider bar 70 into the slots 68 of the joining clips 48.

As a further feature to assist in connecting the joining clips 48 to the extension walls 14 of the second supports 12 the joining clips 48 may further include a locating lug or guidepost 94 located on each of the sides 54 and 56 of the joining clip 48 as illustrated in FIGS. 6 and 7. These guideposts are configured to mate with a guide aperture 96 that is part of the aperture groupings 52. Preferably the guideposts 94 have a length greater than the length of the tines 50 such that the guideposts 94 engage with the guide apertures 96 prior to the tines 50 engaging with the locking apertures 58 during insertion. Thus, the insertion of the guideposts 94 into the guide apertures 96 ensures that the joining clips 48 are properly located in a prescribed position where the tines 50 will properly engage with the locking apertures 58.

It is noted that the means used to connect two roller trays 4, namely the joining clips 48 and associated aperture groupings 52, is only one conceivable means of fastening two roller trays 4 together in order to effect a selectable width gravity feed roller system. It will be appreciated by those of ordinary skill in the art that other means to fasten the roller trays 4 together may be employed such as screws, nuts and bolts, soldering, welding, clips, bars, elastic bands, magnets and other conceivable fastening means in the present system in order to join two trays 4 together. Furthermore, the divider may be comprised of any suitable means that allows the larger dispensing surface 72 to be divided into the respective first and second singular dispensing surfaces 76 and 78 by locating the divider at the junction of the second supports 12 of the roller trays 4.

While the present disclosure has explained particular examples, it will be apparent to those of ordinary skill in the art that the scope of this disclosure is not limited to those examples. On the contrary, this patent covers all apparatus as falling within the spirit and scope of the appended claims, either literally or under the doctrine of equivalents.

What is claimed is:

1. For use in a gravity flow roller track system for transporting product containers, a roller track comprising:

a roller tray having a bottom and first and second side supports, the first side support comprising a first support wall, a first extension wall, and a guide wall, the first support wall extending substantially normal to the bottom, the first extension wall extending substantially normal to the first support wall, the guide wall extending substantially normal to the bottom from the extension wall, the second side support comprising a second support wall and a second extension wall, the second support wall extending substantially normal to the bottom and having a plurality of apertures therein configured to receive a joining clip and the second extension wall extending substantially normal to the second support wall, each of the first and second support walls including a plurality of spaced recesses; and a plurality of rollers having first and second ends, the first and second ends being mounted in the plurality of recesses.

2. A roller track as defined in claim 1, wherein the joining clip includes one or more tines and at least one guide pin and at least some of the apertures in the plurality are arranged in a group that includes a pair of apertures configured to receive the tines of the joining clip and an aperture configured to receive the guide pin of the joining clip.

3. A roller track as defined in claim 1, wherein the first side support is substantially z-shaped in vertical cross-section.

4. A roller track as defined in claim 1, wherein the roller tray is integrally formed.

5. A roller track as defined in claim 1, wherein each of the plurality of rollers includes first and second end hubs, and wherein top portions of the spaced recesses are slightly smaller in diameter than the end hubs, the hubs being frictionally held within the spaced recesses.

6. A roller track as defined in claim 1, wherein the rollers are positioned to extend above the first and second extension walls.

7. A roller track as defined in claim 1, wherein the first and second extension walls extend from the respective first and second support walls at acute angles.

8. A roller track as defined in claim 1, wherein the first and second extension walls each extend downwardly and away from the first and second support walls, respectively, at angles within the range of approximately 45 degrees to approximately 85 degrees.

9. A selectable width gravity feed roller system comprising:
a first roller tray having a plurality of rollers and first and second sides being fixedly separated, the first and second sides supporting the rollers, the first side having a first height and the second side having a second height that is less than the first height;
a second roller tray having a plurality of rollers and first and second sides being fixedly separated, the first and second sides supporting the rollers, the first side having a first height and the second side having a second height that is less than the first height; and
a joining clip operable to connect the first roller tray to the second roller tray;
wherein each of the second sides of the first and second roller trays include a plurality of apertures defined therein and the joining clip includes protruding tines configured to engage with respective ones of the plurality of apertures for operably connecting the first roller tray to the second roller tray.

10. A system as defined in claim 9, wherein the joining clip has a top portion defining a slot formed therein; and further comprising:
a divider bar configured to engage with the slot.

11. A system as defined in claim 10, wherein the divider bar is selectively placed in the slots of the joining clips to divide the first and second roller trays into two dispensing roller trays.

12. A system as defined in claim 9, wherein the tines comprise a center post and a pair of flexible arms, each of the arms being joined at one end to the center post.

13. A system as defined in claim 12, wherein the flexible arms are configured to move toward the center post when being inserted into the respective apertures and move away from the center post when the tines are fully inserted into the aperture such that the tines are locked into the apertures.

14. A system as defined in claim 9, wherein the apertures further comprise guide apertures and the joining clip comprises first and second sides having guideposts configured for insertion into respective ones of the guide apertures to locate the joining clip in a prescribed position.

15. A system as defined in claim 14, wherein the prescribed position comprises a position where the tines may properly engage with the respective ones of the apertures.

16. A system as defined in claim 14, wherein the guideposts have a length greater than a length of the tines.

17. A system as defined in claim 12, wherein the flexible arms and center post define a generally arrow shape profile.

18. A gravity feed roller system for dispensing products comprising:
a plurality of rollers;
a plurality of roller trays each having first and second substantially vertical sides supporting the rollers to form a first roller dispensing surface, the first vertical side having a first height and the second side having a second height that is less than the first height;
connecting means for releasably connecting at least two of the roller trays along the second sides to form a second roller dispensing surface, the second roller surface including at least two of the first roller dispensing surfaces;
divider wherein the connecting means includes releasably securing means for releasably securing the divider for dividing the second roller surface into the two first roller dispensing surfaces, wherein the divider is releasably secured in the releasably securing means and said divider is located at a junction of the second sides of the connected roller trays to selectively divide the second roller dispensing surface into two separate product dispensing surfaces.

19. A system as defined in claim 18, wherein the first vertical side extends above the first roller dispensing surface in the vertical direction and the second vertical side lies below the first roller dispensing surface in the vertical direction.

20. A system as defined in claim 18, wherein the means for connecting comprises generally vertically-oriented slots receivably retaining a removable divider bar member to selectively separate the respective first roller dispensing surfaces of the plurality of roller trays.

21. A system comprising:
a first roller tray;
a second roller tray;
a clip selectively connecting the first and second roller trays to form a first roller surface having a first width; and
a divider independent of the first roller tray and the second roller tray and selectively engageable with the clip to selectively divide the first roller surface into a second roller surface and third roller surface.

22. A system as defined in claim 21, wherein the second roller surface has a second width and the third roller surface has a third width.

23. A system as defined in claim 22, wherein the second width and the third width are substantially the same.

24. A roller tray comprising:
a first wall having a first height and supported to receive and journal roller ends of a plurality of rollers; and a second wall having a second height that is lower than the first height and supported to receive and journal other roller ends of the plurality of rollers;

wherein the plurality of rollers are journaled in the first and second walls to define a roller surface, the roller surface being below the first height and above the second height; and wherein the second wall includes a first extension wall extending upward, a second extension wall extending outward, and a recess extending through the first extension wall and the second extension wall, wherein one of the plurality of rollers is journaled in the recess, the second wall further including means for connecting the roller tray to another roller tray in order to selectively increase a size of the roller surface.

25. A roller tray as defined in claim 24, wherein the means for connecting the roller tray to another roller tray includes a plurality of apertures and a clip that engages with the plurality of apertures.

26. For use with a first roller tray and a second roller tray, a clip comprising:

a body extending along an axis and having a first side and a second side;

first and second locating lugs respectively projecting from the first and second sides generally perpendicular to the axis;

first and second tines respectively projecting from the first and second sides, the locating lugs and the tines being dimensioned to connect the first and second roller trays; and a slot defined in a top of the body for selectively receiving a divider to separate the first and second roller trays, wherein the slot is not parallel to the lugs.

27. A clip as defined in claim 26, the body having a thickness that creates a gap between a side of the first roller tray and another side of the second roller tray sufficient to allow the divider to be received in the top of the body.

28. For use in a roller track system for transporting product containers, a method for providing selectable dispensing surface widths comprising:

providing first and second roller trays, each having a plurality of rollers defining respective first and second dispensing surfaces;

connecting the first and second roller trays together at respective joining surfaces of the first and second trays with means for connecting the trays, wherein the joining surfaces of the first and second trays do not extend in an upward direction above the first and second dispensing surfaces defined by the plurality of rollers and a third dispensing surface is correspondingly defined from a combination of at least a portion of the first and second dispensing surfaces; and selectively disposing a removable divider member, which divider member is independent of the first and second roller trays, in the means for connecting the trays between the first and second roller trays, wherein the removable divider is operable to selectively divide the third dispensing surface.

29. A method as defined in claim 28, wherein connecting the first and second roller trays includes providing means for joining the trays at the joining surfaces.

30. A method as defined in claim 29, wherein the means for joining the trays includes a clip having generally vertically-oriented slots to receivably retain the removable divider member to selectively separate the third dispensing surface into at least a portion of the respective first and second dispensing surfaces of the first and second roller trays.

* * * * *